US007603148B2

(12) United States Patent
Michalak (10) Patent No.: US 7,603,148 B2
(45) Date of Patent: Oct. 13, 2009

(54) INTEGRATED WIRELESS HEADSET

(75) Inventor: Gerald P. Michalak, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1010 days.

(21) Appl. No.: 10/736,814

(22) Filed: Dec. 16, 2003

(65) Prior Publication Data

US 2005/0130593 A1 Jun. 16, 2005

(51) Int. Cl.
*H04B 1/38* (2006.01)
*H04M 1/00* (2006.01)

(52) U.S. Cl. ............... 455/575.2; 455/41.2; 455/569.1; 455/420; 455/426.1; 455/575.3; 455/575.6; 379/430; 379/431; 379/433.02

(58) Field of Classification Search ............... 455/41.2, 455/420, 575.1, 575.2, 569.1, 557, 556.1, 455/426.1, 66.1
See application file for complete search history.

(56) References Cited

U.S. PATENT DOCUMENTS

| 5,590,417 | A |   | 12/1996 | Rydbeck |           |
|-----------|---|---|---------|---------|-----------|
| 5,721,783 | A |   | 2/1998  | Anderson |          |
| 5,890,074 | A | * | 3/1999  | Rydbeck et al. | 455/558 |
| 5,970,418 | A | * | 10/1999 | Budd et al. | 455/566 |
| 5,978,689 | A | * | 11/1999 | Tuoriniemi et al. | 455/569.1 |
| 6,078,825 | A | * | 6/2000  | Hahn et al. | 455/569.2 |
| 6,144,864 | A | * | 11/2000 | Lands et al. | 455/569.1 |
| 6,230,029 | B1 | * | 5/2001 | Hahn et al. | 455/575.2 |
| 6,760,459 | B2 | * | 7/2004 | Bae | 381/375 |
| 6,868,284 | B2 | * | 3/2005 | Bae | 455/575.2 |
| 6,885,848 | B2 | * | 4/2005 | Lee | 455/41.2 |
| 6,889,065 | B2 | * | 5/2005 | Holmes et al. | 455/569.2 |
| 6,947,766 | B2 | * | 9/2005 | Chan et al. | 455/557 |

(Continued)

FOREIGN PATENT DOCUMENTS

DE 4310873 10/1994

(Continued)

OTHER PUBLICATIONS

Invitation to Pay Additional Fees and Communication Relating to the Results of the Partial International Search mailed Oct. 28, 2004; PCT/US2004/019891 filed Jun. 22, 2004.

(Continued)

*Primary Examiner*—Marceau Milord
(74) *Attorney, Agent, or Firm*—Coats & Bennett, P.L.L.C.

(57) ABSTRACT

A mobile device integrates a wireless headset with the housing of a mobile terminal. In an exemplary embodiment, the housing of the mobile terminal includes a fastener for mechanically connecting the wireless headset to the housing. When the wireless headset is mechanically disconnected from the housing, a speaker and microphone associated with the wireless headset interfaces with the mobile terminal via a wireless interface. However, when the wireless headset mechanically connects to the housing, the speaker and microphone associated with the wireless headset mechanically and electrically connect to the housing and operate as the speaker and microphone for the mobile terminal. A detector circuit included in the mobile device also determines the position of the wireless headset relative to the mobile terminal, and may automatically select a wireless or electrical interface between the wireless headset and the mobile terminal based on the determined position.

45 Claims, 4 Drawing Sheets

U.S. PATENT DOCUMENTS

| | | | |
|---|---|---|---|
| 6,950,674 B2 * | 9/2005 | Jarrett | 455/552.1 |
| 6,954,657 B2 * | 10/2005 | Bork et al. | 455/567 |
| 7,010,332 B1 * | 3/2006 | Irvin et al. | 455/575.2 |
| 7,027,841 B2 * | 4/2006 | Ishii | 455/569.1 |
| 7,054,659 B2 * | 5/2006 | Gioscia et al. | 455/556.1 |
| 7,076,277 B2 * | 7/2006 | Kim et al. | 455/569.1 |
| 7,110,798 B2 * | 9/2006 | Nassimi | 455/575.2 |
| 7,120,476 B2 * | 10/2006 | Yoo | 455/575.1 |
| 7,146,004 B2 * | 12/2006 | Bodley et al. | 379/430 |
| 7,149,552 B2 * | 12/2006 | Lair | 455/569.1 |
| 7,174,026 B2 * | 2/2007 | Niederdrank | 381/315 |
| 7,242,765 B2 * | 7/2007 | Hairston | 379/419 |
| 7,292,880 B2 * | 11/2007 | Lehtonen | 455/569.1 |
| 7,363,060 B2 * | 4/2008 | Bernhart et al. | 455/567 |
| 7,369,532 B2 * | 5/2008 | Silvester | 370/349 |
| 7,373,182 B2 * | 5/2008 | Zatloukal et al. | 455/569.1 |
| 2001/0029187 A1 | 11/2001 | Mooney et al. | |
| 2002/0058536 A1 | 5/2002 | Yukinobu et al. | |
| 2002/0111140 A1 * | 8/2002 | Kim | 455/41 |

FOREIGN PATENT DOCUMENTS

| | | |
|---|---|---|
| DE | 19616867 | 3/1997 |
| WO | WO01/06344 | 1/2001 |

OTHER PUBLICATIONS

PCT International Search Report—International Application No. PCT/US2004/019891 filed Jun. 22, 2004.

* cited by examiner

INTEGRATED WIRELESS HEADSET

BACKGROUND OF THE INVENTION

The present invention relates generally to wireless mobile devices, and more particularly to a wireless headset integrated with a mobile device.

The popularity of mobile devices, such as cellular telephones, personal data assistants (PDAs), etc., continues to increase each year. To maintain this trend, manufacturers continue to explore ways to make mobile devices appeal to a larger percentage of the population. One area of focus involves hands-free wireless communication where wireless headsets communicate with a local mobile device via a local wireless network.

Because wireless headsets free-up a user's hands while the user communicates with friends, family, and colleagues using their mobile device, users are free to perform other tasks, such as driving, shopping, etc. As a result, wireless headsets increase the convenience of using a mobile device. However, because conventional wireless headsets are separate from mobile devices, a user has to separately track and carry the wireless headset. Further, users typically have to separately monitor the headset battery and charge the wireless headset battery on special headset chargers, which may be separate from the mobile device charger. To many users, the inconvenience of having to separately maintain and track the wireless headset outweighs the convenience associated with using the wireless headset.

SUMMARY OF THE INVENTION

The present invention comprises a method and apparatus that integrates a wireless headset with a mobile terminal. In an exemplary embodiment, the housing of the mobile terminal includes a fastener for mechanically connecting the wireless headset to the housing. When the wireless headset is mechanically connected to the housing, the wireless headset interfaces with the mobile terminal via an electrical interface. Alternatively, when the wireless headset is mechanically disconnected from the housing, the wireless headset interfaces with the mobile terminal via a wireless interface.

In exemplary embodiments, the speaker and microphone associated with the wireless headset also operate as the mobile terminal speaker and microphone. Thus, when the wireless headset is mechanically connected to the mobile terminal, the speaker and microphone of the wireless headset interface with the mobile terminal via an electrical interface and operate as a conventional speaker and microphone for the mobile terminal. However, when the wireless headset is mechanically disconnected from the mobile terminal, the speaker and microphone are also mechanically disconnected from the mobile terminal. As a result, the speaker and microphone interface with the mobile terminal via a wireless interface.

Exemplary embodiments of the present invention may also include a detector circuit to determine the position of the wireless headset relative to the mobile terminal. The mobile device then automatically selects an operating mode based on the determined position. For example, if the detector circuit determines that the wireless headset is mechanically disconnected from the mobile terminal, the mobile terminal may automatically select a wireless-interface operating mode and establish a wireless interface between the wireless headset and the mobile terminal. Alternatively, if the detector circuit determines that the wireless headset is mechanically connected to the mobile terminal, the mobile terminal may automatically select an electrical-interface operating mode, and establish an electrical interface between the wireless headset and the mobile terminal.

DETAILED DESCRIPTION OF THE INVENTION

The following describes a cellular telephone with an integrated wireless headset that operates in one of two operating modes. In a first operating mode, the wireless headset is mechanically and electrically connected to the cellular telephone such that the speaker and microphone of the wireless headset operate as the speaker and microphone of the cellular telephone. In the second operating mode, the wireless headset is mechanically and electrically disconnected from the cellular telephone. In this mode, the speaker and microphone of the wireless headset interface with the cellular telephone via a wireless interface.

Figure 1A:
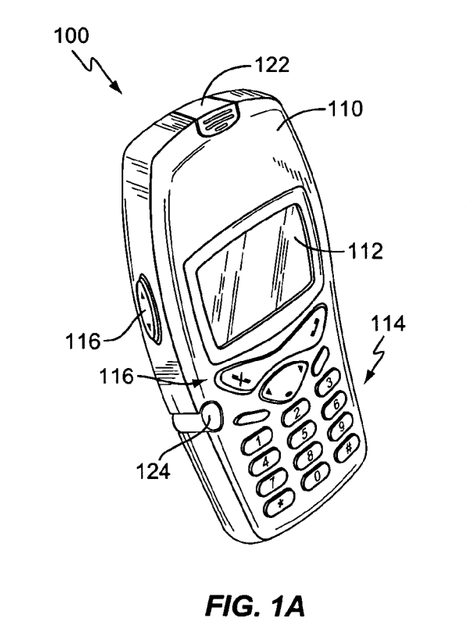
FIGS. 1A-1C illustrate a series of schematic views of an exemplary mobile device and wireless headset according to the present invention.
Figure 1B:
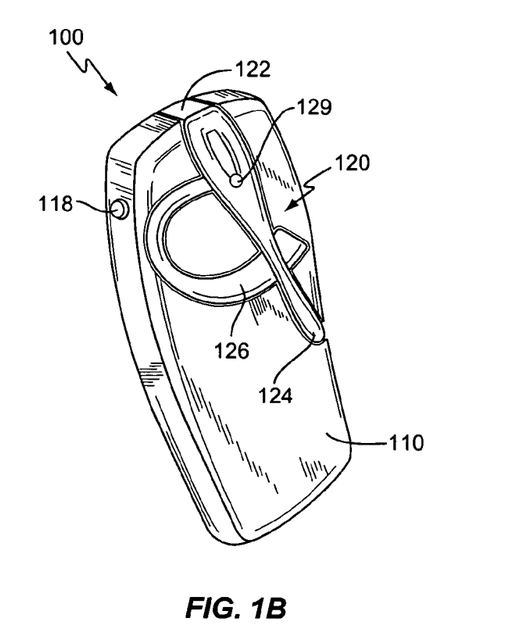
Figure 1C:
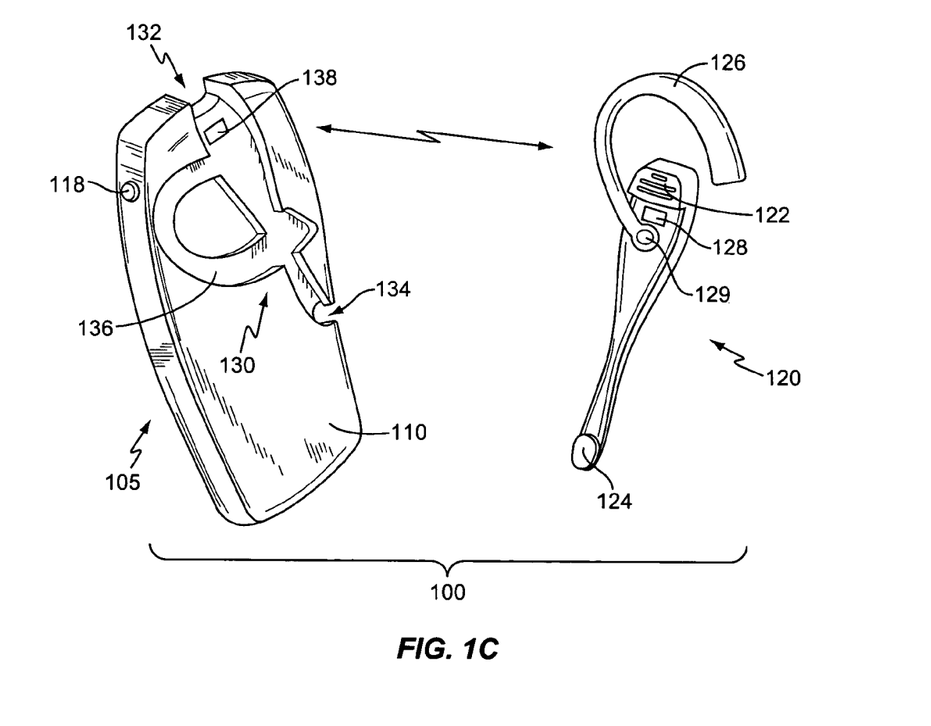

FIGS. 1A-1C illustrate an exemplary mobile device 100 comprising a cellular telephone 105 and a wireless headset 120 according to the present invention. While the present invention is described in terms of a cellular telephone, those skilled in the art will appreciate that the present invention is applicable to any mobile device, including a clamshell cellular telephone, a Personal Communication System (PCS), a Personal Digital Assistant (PDA), a conventional laptop and/or palmtop receiver, or any other mobile device that includes a radiotelephone transceiver.

Mobile device 100 includes a cellular telephone 105 with an associated housing 110 and a wireless headset 120. Housing 110 encases the electrical components of the cellular telephone 105 and typically includes user interface components, such as a display 112, keypad 114, and/or control buttons 116 disposed on the outer surface of housing 110. A user interfaces with the cellular telephone 105 according to any conventional method. For example, the user may interface with cellular telephone 105 via the user interface components, as known in the art. Alternatively, cellular telephone 105 may include voice recognition capabilities that allow the user to interface with cellular telephone 105 using voice commands.

Wireless headset 120 is a hands-free communication device that enables a user to communicate with the cellular telephone 105 using a local wireless interface. In exemplary embodiments, the local wireless interface comprises a short-range ad hoc wireless network, such as a Bluetooth® network. A Bluetooth® network is a universal radio interface that enables two or more wireless devices to communicate wirelessly via short-range ad hoc networks. For further details regarding Bluetooth® technology, the interested reader may refer to "Bluetooth—The universal radio interface for ad hoc, wireless connectivity," presented by Jaap Haartsen in Ericsson Review No. 3, 1998, which is herein incorporated by reference. While the present application refers to a short-range ad hoc wireless network as a "Bluetooth® network," those skilled in the art will appreciate that the present invention is not limited to Bluetooth® networks and is applicable to any wireless interface between a cellular telephone 105 and a wireless headset 120.

Wireless headset 120 generally includes a speaker 122 for projecting audible signals to a user, a microphone 124 for receiving audible signals from a user, and a support for securing the wireless headset 120 to the head of a user, such as an ear support 126. Further, wireless headset 120 may include a pivot connector 129 that pivotally connects the ear support 126 to the microphone 124, and enables the user to position the microphone 124 at any desired location relative to the ear support 126 by rotating the microphone 124 about pivot connector 129.

Pivot connector 129 also enables the wireless headset 120 to be positioned into a compact arrangement that can be integrated and stored with cellular telephone 105 using a fastener. The fastener may be any fastening means known in the art, including straps, brackets, clips, etc., that secures the wireless headset 120 to the housing 110. In an exemplary embodiment, the fastener is a recess 130 disposed in housing 110, as shown in FIG. 1C. Recess 130 is generally designed to secure the wireless headset 120 to housing 110. In one exemplary embodiment, recess 130 may frictionally hold the wireless headset 120 to the housing 110. Alternatively, in another exemplary embodiment, recess 130 may include a latch, such as a magnetic latch, a spring clip, etc., that holds wireless headset 120 within the recess 130. In any event, the user may secure the wireless headset 120 to the housing 110 by pushing the wireless headset 120 into the recess. When the user is ready to use wireless headset 120, the user may remove the wireless headset 120 from the recess 130 by pulling on the wireless headset 120 or by pressing a release button (not shown) disposed on the housing 110 to release the wireless headset 120 from the recess 130.

Recess 130 includes a speaker area 132 adapted to receive speaker 122, a microphone area 134 adapted to receive microphone 124, and an ear support area 136 adapted to receive ear support 126. In exemplary embodiments, the shapes of the speaker, microphone, and ear support areas 132, 134, 136 complement the shapes of the speaker 122, microphone 124, and ear support 126, respectively. Further, the depth of recess 130 may be structured such that the wireless headset 120 is flush with the housing 110 when secured within the recess 130.

As shown in FIG. 1C, recess 130 is positioned generally on a back of housing 110. Those skilled in the art, however, will appreciate that the recess 130 is not limited to this configuration, and may be formed on any portion of the housing 110 as appropriate for a given wireless headset 120 and cellular telephone 105. In the embodiment of FIG. 1C, microphone area 134 is generally positioned proximate a side and/or bottom of housing 110, while speaker area 132 is generally positioned proximate the top of housing 110. Further, microphone area 134 may include an additional cutout section in a side of the housing 110 that positions the microphone 124 proximate the front of the housing 110 when wireless headset 120 is secured within the recess 130. The microphone cutout section may extend to the front of the housing 110, as shown in FIGS. 1A and 1C. Alternatively, the microphone cutout section may only extend through a portion of the side of the housing 110. Speaker area 132 may also include an additional cutout section in the top of housing 110 that enables speaker 122 to extend to the front of the housing 110 when wireless headset 120 is secured within the recess 130. As a result, when wireless headset 120 is secured within recess 130, the speaker 122 and microphone 124 are positioned proximate the locations conventionally reserved for the speaker and microphone of a conventional cellular telephone 105. Therefore, in addition to functioning as the primary speaker and microphone for the wireless headset 120, speaker 122 and microphone 124 also function as the primary speaker and microphone for the cellular telephone 105 when the wireless headset 120 is secured to the housing 110.

To facilitate using the speaker 122 and microphone 124 as the speaker and microphone of cellular telephone 105, cellular telephone 105 also includes electrical interface means, such as a connector or electrical contact, to electrically interface the wireless headset 120 with the cellular telephone 105 when the wireless headset 120 is mechanically secured to the housing 110. In an exemplary embodiment, the electrical interface includes an electrical contact 138 disposed on a surface of the recess 130 that mates with a corresponding electrical contact 128 disposed on wireless headset 120. Accordingly, when wireless headset 120 is secured within recess 130, electrical contacts 128, 138 electrically connect the wireless headset 120 to the cellular telephone 105. While FIG. 1C only shows one electrical contact 128, 138, those skilled in the art will appreciate that more than one electrical contact 128 may electrically connect wireless headset 120 to cellular telephone 105.

Figure 2:
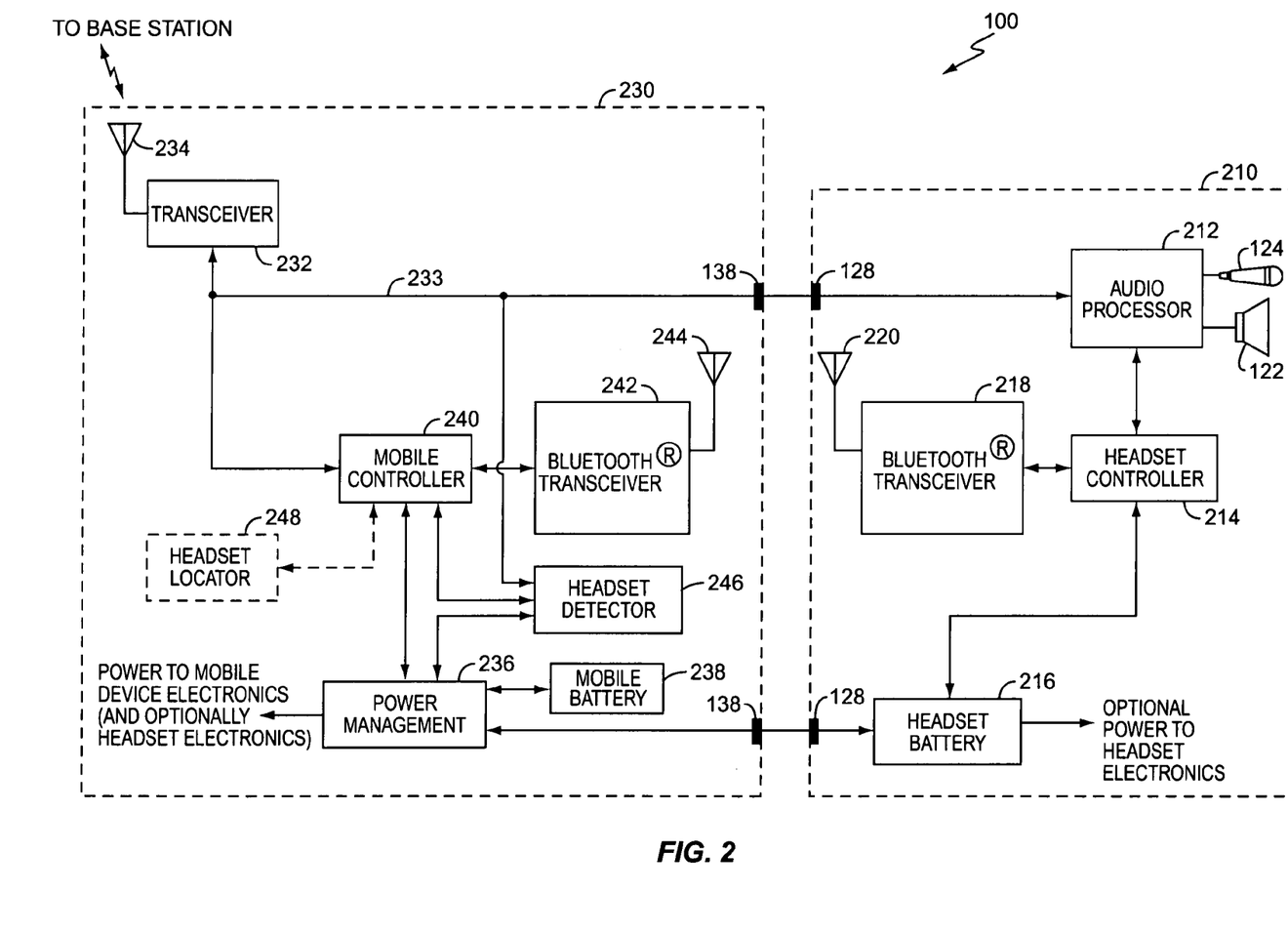
FIG. 2 illustrates a block diagram of an exemplary mobile device and wireless headset operating in an electrical-interface operating mode according to the present invention.
Figure 3:
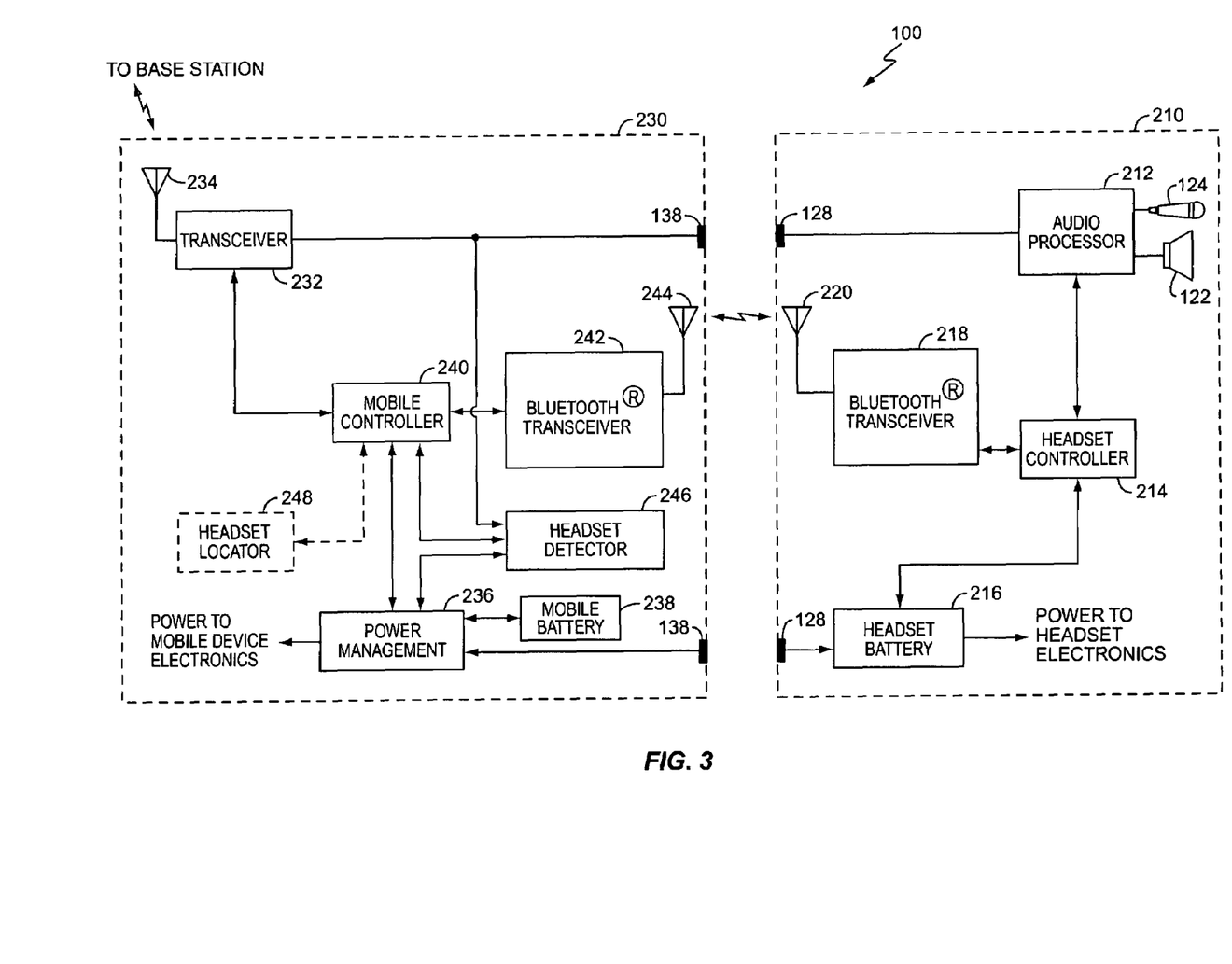
FIG. 3 illustrates a block diagram of an exemplary mobile device and wireless headset operating in a wireless-interface operating mode according to the present invention.
Figure 4:
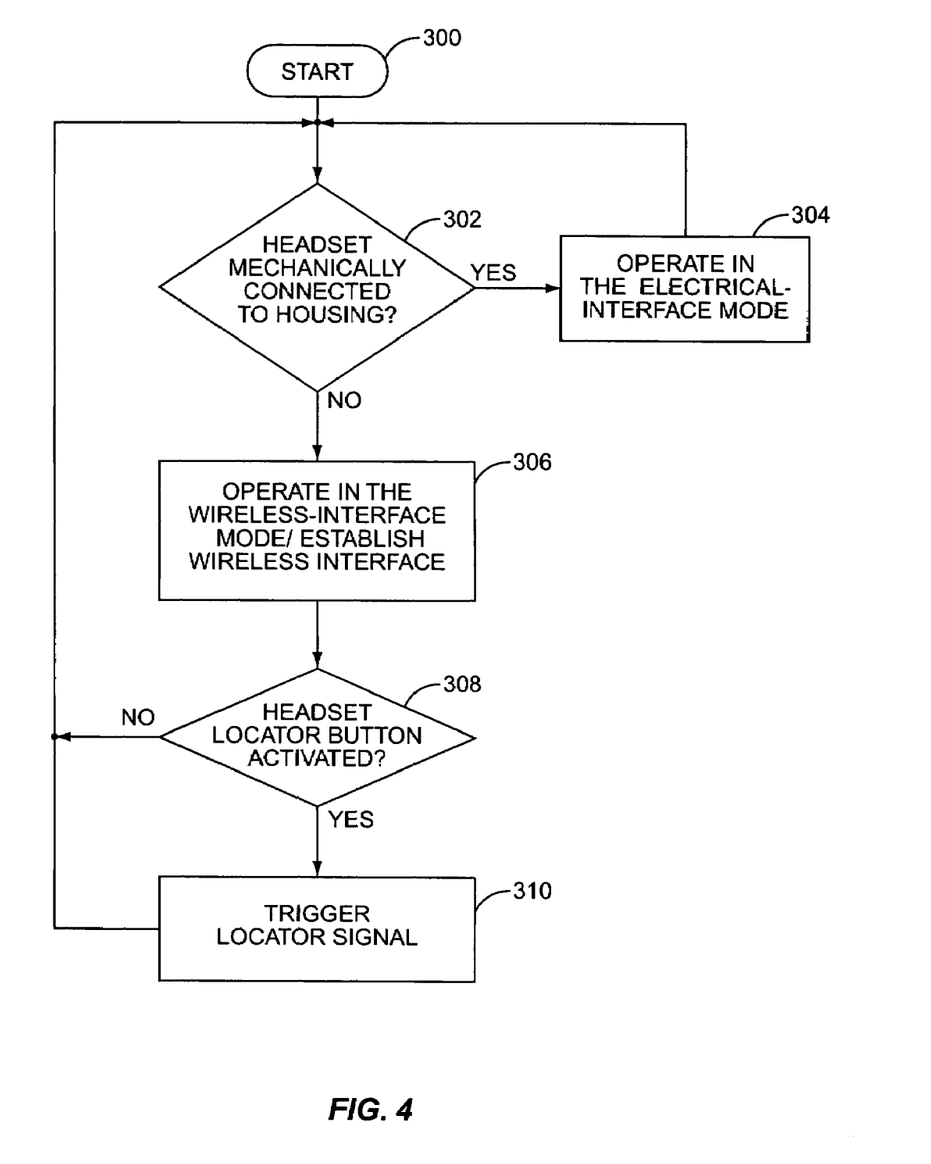
FIG. 4 illustrates an exemplary method of determining the position of the wireless headset relative to the mobile device.

Referring now to FIGS. 2-4, operational details of the present invention will be described further. FIGS. 2 and 3 illustrate a block diagram of an exemplary mobile device 100. To facilitate the following discussions, each illustrated component of mobile device 100 is shown as a separate element. However, those skilled in the art will appreciate that two or more of these components may be combined into a single microprocessor, application specific integrated circuit, or other suitable circuit.

Mobile device 100 includes headset electronics 210 associated with wireless headset 120 and mobile device electronics 230 associated with cellular telephone 105. Headset electronics 210 include a headset controller 214 for controlling the headset electronics 210 and a headset battery 216 for providing power to the headset electronics 210. Headset electronics 210 further include speaker 122 for projecting audible signals to a user, microphone 124 for receiving audible signals from the user, and an audio processor 212. Audio processor 212 processes audio signals received from the mobile device electronics 230 according to known methods, and provides the processed audio signals to speaker 122 for projection to the user. Audio processor 212 further processes audible signals received by microphone 124 according to known methods, and forwards the processed audio signals to the mobile device electronics 230. As discussed further below, audio processor 212 transmits/receives audio signals to/from the mobile device electronics 230 via an electrical or wireless interface, depending on the current operating mode of the mobile device 100. To that end, headset electronics 210 further include a wireless transmitter, such as a Bluetooth® transceiver 218 and antenna 220 for communicating with the mobile device electronics 230 via the wireless interface according to instructions provided by headset controller 214.

Mobile device electronics 230 include a transceiver 232 for transmitting/receiving information signals to/from a base station via a cellular antenna 234. Transceiver 232 may operate according to any known standard, including GSM, TIA/EIA-136, cdmaOne, IS-95, cdma2000, UMTS, or Wideband CDMA.

Mobile device electronics 230 also includes a power management circuit 236, mobile battery 238, mobile controller 240, and local wireless transmitter, such as a Bluetooth® transceiver 242 and antenna 244. Power management circuit 236 monitors and regulates the power of the mobile battery 238 according to known power management techniques. For example, power management circuit 236 may monitor the power level of the mobile battery 238, regulate a power dissipation rate of the mobile battery 238, and/or regulate and control the charging process used to charge mobile battery 238. In addition to the conventional power management of mobile battery 238, power management circuit 236 may also manage the power of headset battery 216 when power management circuit 236 is electrically connected to the headset battery 216. For example, power management circuit 236 may charge headset battery 216 and/or provide power to the headset electronics 210 via the headset battery 216.

The operation of the power management circuit 236 and the operations of other components in the mobile device electronics 230 is controlled by mobile controller 240 according to known techniques. Mobile controller 240 may also control the operating mode of the cellular telephone 105, and typically controls the operation of Bluetooth® transceiver 242 and antenna 244 based on the operating mode. For example, mobile controller 240 may enable an electrical-interface operating mode when there is an electrical connection between headset electronics 210 and mobile device electronics 230, i.e., when wireless headset 120 is mechanically connected to housing 110, as shown in FIG. 1B and functionally represented by FIG. 2. In the electrical-interface operating mode, mobile controller 240 disables the Bluetooth® transceiver 242 and antenna 244, and relies solely on the electrical connections made by electrical contacts 128, 138 to provide a communication path between mobile device electronics 230 and headset electronics 210.

However, when there is no electrical connection between headset electronics 210 and mobile device electronics 230, such as when the wireless headset 120 is mechanically disconnected from the housing 110, as shown in FIG. 1C and functionally represented by FIG. 3, mobile controller 240 may enable a wireless-interface operating mode. In the wireless-interface operating mode, mobile controller 240 enables the Bluetooth® transceiver 242 and antenna 244 to establish a wireless interface between the headset electronics 210 and the mobile device electronics 230 according to Bluetooth® protocols known in the art.

In addition to the above-described components, mobile device electronics 230 also includes a mode control, such as headset detector 246, that indicates a desired operating mode to the mobile controller 240. Headset detector 246 selects a desired operating mode, i.e., an electrical-interface or wireless-interface operating mode according to a mode-related user input. In some embodiments, headset detector 246 selects the operating mode based on a command entered via the user interface or the position of a switch disposed on the housing 110.

Alternatively, in a preferred embodiment of the present invention, headset detector 246 automatically selects the operating mode based on the user-selected location of the wireless headset 120 relative to the cellular telephone 105. For example, headset detector 246 may select the operating mode based on whether or not the wireless headset 120 is mechanically connected to the housing. In exemplary embodiments of the present invention, headset detector 246 determines if the wireless headset 120 is mechanically connected to housing 110 by determining if an electrical connection exists between the headset electronics 210 and the mobile device electronics 230. For example, headset detector 246 may monitor an electrical trace in the mobile device electronics 230, such as trace 233, to determine if there is current flowing between the mobile device electronics 230 and the headset electronics 210. When an electrical current flow is detected, headset detector 246 determines that the headset electronics 210 are electrically connected to the mobile device electronics 230. Alternatively, headset detector 246 may monitor the power management circuit 236 to determine if the power management circuit 236 is providing electrical current to the headset electronics 210. In any event, when electrical current is flowing between the mobile device electronics 230 and headset electronics 210, headset detector 246 determines that the wireless headset 120 is mechanically connected to the housing 110, and selects the electrical-interface operating mode; when no electrical current flow is detected, headset detector 246 determines that the wireless headset is mechanically disconnected from the housing 110, and selects the wireless-interface operating mode.

In addition to headset detector 246, mobile device electronics 230 may also include an optional headset locator 248 operatively connected to a locator button 118 disposed on housing 110. In response to the user activating the locator button 118, headset locator 248 transmits a locator request signal to the wireless headset 120. Upon receipt of the locator request signal, wireless headset 120 projects a locator signal, such as a visible and/or audible signal from the wireless headset 120. The user may then locate wireless headset 120 by seeing and/or hearing the locator signal projected from wireless headset 120.

Referring now to FIG. 4, an exemplary method of headset detection and location will be described. Mobile device electronics 230 begin the headset detection loop (Block 300) at any appropriate time, i.e., when mobile device 100 powers up. Headset detector 246 then determines if the wireless headset 120 is mechanically connected to the housing 110 according to any of the methods described above (Block 302). If wireless headset 120 is mechanically connected to the housing 110, mobile device 100 operates in the electrical-interface operating mode (Block 304). However, if wireless headset 120 is mechanically disconnected from the housing 110, mobile device 100 operates in the wireless-interface operating mode and establishes the wireless interface between the mobile device electronics 230 and the headset electronics 210 (Block 306).

In some embodiments, the output of Block 306 may return to Block 302, where control of the headset detection loop is maintained in the headset detector 246, and the process of Blocks 302-306 is repeated. However, if mobile device electronics 230 includes a headset locator 248, the output of Block 306 may continue to Block 308, where control of the headset detection loop is transferred to headset locator 248. Headset locator 248 then determines if locator button 118 has been activated (Block 308). If locator button 118 has not been activated, control of the headset detection loop returns to the headset detector 246, and the process of Blocks 302-308 repeats. However, if locator button 118 has been activated, headset locator 248 triggers the locator signal (Block 310) before returning control of the headset detection loop to the headset detector 246, where the process of Blocks 302-308 repeats.

The above discloses a cellular telephone 105 with an integrated wireless headset 120. Because the wireless headset 120 may be electrically and mechanically integrated with the cellular telephone 105, the present invention includes several benefits over conventional mobile device/wireless headset combinations. First, because the wireless headset 120 is integral with the housing 110 of the cellular telephone 105, wireless headset 120 is readily available anytime the user has their cellular telephone 105 with them. Further, because the headset electronics 210 are electrically connected to the mobile device electronics 230 when the wireless headset 120 is mechanically connected to the housing 110, the headset battery 216 may be charged at the same time as, and with the same charger as, the mobile battery 238. As a result, only one charger is required to charge the mobile and headset batteries 238, 216. In addition, in the embodiments where the headset detector 246 automatically determines the position of the wireless headset 120, a user can activate the wireless-interface mode simply by removing the wireless headset 120 from housing 110. As a result, the user does not have to track the operating mode of cellular telephone 105.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile device comprising: a mobile terminal with an associated housing; a wireless headset including a speaker and a microphone; a fastener disposed on the housing for mechanically connecting the wireless headset to the housing; and a detector circuit to determine a position of the wireless headset relative to the mobile terminal, wherein the mobile device automatically selects an electrical interface operating mode for communicating with the wireless headset when the detector circuit determines that the wireless headset is mechanically connected to the mobile terminal, and wherein the mobile device automatically selects a wireless interface operating mode for communicating with the wireless headset when the detector circuit determines that the wireless headset mechanically disconnected from the mobile terminal.

2. The mobile device of claim 1 wherein the electrical interface operating mode and wireless interface operating mode comprise respective first and second operating modes, wherein the wireless headset is adapted to operate in the first operating mode when mechanically connected to the housing and further wherein the wireless headset is adapted to operate in the second operating mode when mechanically disconnected from the housing.

3. The mobile device of claim 2 wherein the wireless headset interfaces with the mobile terminal via the wireless interface when said wireless headset is operating in the second operating mode.

4. The mobile device of claim 2 wherein the wireless headset interfaces with the mobile terminal via the electrical interface when said wireless headset is operating in the first operating mode.

5. The mobile device of claim 4 further comprising a first electrical contact disposed on the housing and a second electrical contact disposed on the wireless headset, wherein the first electrical contact electrically connects to the second electrical contact when said wireless headset is operating in the first operating mode.

6. The mobile device of claim 2 wherein in the first mode the wireless headset is fastened to the housing such that the housing and the wireless headset form a single unit.

7. The mobile device of claim 6 wherein both the housing and the wireless headset each include at least one electrical contact such that when the wireless headset is fastened to the housing, electrical signals are transferred between the mobile terminal and the wireless headset.

8. The mobile device of claim 7 wherein when the wireless headset is fastened to the housing and operating in the first mode, the speaker and microphone of the wireless headset function as the speaker and microphone for the mobile terminal.

9. The mobile device of claim 8 wherein the mobile terminal does not include a speaker and microphone in the housing and therefore is incapable of communicating audible signals with a user except in conjunction with the wireless headset.

10. The mobile device of claim 1 wherein the fastener comprises a recess disposed on the housing for receiving the wireless headset.

11. The mobile device of claim 10 wherein the recess is configured to secure the wireless headset to the housing.

12. The mobile device of claim 10 wherein the recess is configured to frictionally secure the wireless headset to the housing.

13. The mobile device of claim 10 wherein the wireless headset mechanically connects to the housing when the wireless headset is secured within said recess.

14. The mobile device of claim 10 wherein the wireless headset is flush with the housing when the wireless headset is secured within said recess.

15. The mobile device of claim 10 wherein the fastener further comprises a cutout in a side of the housing adjacent said recess.

16. The mobile device of claim 15 wherein the speaker is disposed within the cutout when the wireless headset is secured within said recess.

17. The mobile device of claim 15 wherein the microphone is disposed within the cutout when the wireless headset is secured within said recess.

18. The mobile device of claim 10 wherein the recess is disposed on a back of the housing.

19. The mobile device of claim 18 wherein said recess is further disposed on at least one of a top, a front, and a side of the housing.

20. The mobile device of claim 1 wherein the speaker is disposed proximate a top of the housing when the wireless headset is mechanically connected to the housing.

21. The mobile device of claim 1 wherein the microphone is disposed proximate a bottom portion of the housing when the wireless headset is mechanically connected to the housing.

22. The mobile device of claim 1 wherein the microphone is disposed proximate a side of the housing when the wireless headset is mechanically connected to the housing.

23. The mobile device of claim 1 wherein the housing further includes a wireless headset locator control.

24. The mobile device of claim 23 wherein the wireless headset projects a locator signal when a user activates the wireless headset locator control.

25. The mobile device of claim 1 wherein the mobile terminal comprises a cellular telephone.

26. The mobile device of claim 1 wherein the detector circuit determines that the headset is mechanically connected to the mobile terminal when the detector circuit detects an electrical current flow between the mobile terminal and the headset.

27. The mobile device of claim 1 wherein the headset is mechanically connected to the mobile terminal when the headset is secured within a recess disposed in at least one side of a housing of the mobile terminal.

28. The mobile device of claim 27 further comprising:
a first electrical contact disposed on a surface of the recess;
a second electrical contact disposed on a surface of the headset; and wherein the first electrical contact electrically connects to the second electrical contact when the headset is secured within the recess.

29. The mobile device of claim 27 wherein the recess frictionally secures the headset to the housing.

30. A mobile terminal comprising: a wireless headset comprising a speaker for projecting audible signals to a user and a microphone for receiving audible signals from the user; wherein said speaker and microphone interface with the mobile terminal via an electrical interface when said speaker and microphone are mechanically connected to the mobile terminal; wherein said speaker and microphone interface with the mobile terminal via a wireless interface when said headset including said speaker and microphone is mechanically disconnected from the mobile terminal; and a detector circuit to determine a position of the headset relative to the mobile terminal, wherein the mobile terminal automatically establishes a wireless or electrical interface between the mobile terminal and the headset responsive to the determined position.

31. The mobile terminal of claim 30 wherein the wireless interface comprises a short-range wireless network.

32. The mobile terminal of claim 31 wherein the short-range wireless network comprises a short-range ad hoc wireless network.

33. The mobile terminal of claim 30 wherein the speaker and microphone are disposed in a wireless headset.

34. The mobile terminal of claim 33 wherein the speaker and microphone are mechanically connected to the mobile terminal when the wireless headset is mechanically disconnected from the mobile terminal.

35. The mobile terminal of claim 33 wherein the speaker and microphone are mechanically connected to the mobile terminal when the wireless headset is mechanically connected to the mobile terminal.

36. The mobile terminal of claim 35 wherein the wireless headset mechanically connects to the mobile terminal when the wireless headset is secured within a recess on a housing of the mobile terminal.

37. The mobile terminal of claim 36 wherein the recess frictionally secures the wireless headset to the housing.

38. The mobile terminal of claim 33 wherein the wireless headset further includes audio processing circuitry to process the audible signals.

39. The mobile terminal of claim 38 wherein the audio processing circuitry interfaces with the mobile terminal via the electrical interface when the speaker and microphone are mechanically connected to the mobile terminal.

40. The mobile terminal of claim 38 wherein the audio processing circuitry interfaces with the mobile terminal via the wireless interface when the speaker and microphone are mechanically disconnected from the mobile terminal.

41. The mobile terminal of claim 33 further comprising a headset locator wherein the speaker projects a locator signal when the headset locator is activated.

42. The mobile terminal of claim 30 wherein the mobile terminal establishes the wireless interface between the mobile terminal and the headset when the detector circuit determines that the headset is mechanically disconnected from the mobile terminal.

43. The mobile terminal of claim 30 wherein the mobile terminal establishes the electrical interface between the mobile terminal and the headset when the detector circuit determines that the headset is mechanically connected to the mobile terminal.

44. The mobile terminal of claim 43 wherein the detector circuit determines that the headset is mechanically connected to the mobile terminal when the detector circuit detects electrical current flow between the mobile terminal and the headset.

45. The mobile terminal of claim 44 wherein the detector circuit detects electrical current flow between the mobile terminal and the headset by detecting electrical current flow between mobile terminal circuitry and headset circuitry.

* * * * *

UNITED STATES PATENT AND TRADEMARK OFFICE
CERTIFICATE OF CORRECTION

PATENT NO. : 7,603,148 B2
APPLICATION NO. : 10/736814
DATED : October 13, 2009
INVENTOR(S) : Michalak Page 1 of 1

It is certified that error appears in the above-identified patent and that said Letters Patent is hereby corrected as shown below:

In col. 9, line 6, remove "wireless".

In col. 9, line 14, remove "headset including said" and change "is" to -- are --.

In col. 9, line 29, change "connected to" to -- disconnected from --.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,603,148 B2 | Page 1 of 1 |
| APPLICATION NO. | : 10/736814 | |
| DATED | : October 13, 2009 | |
| INVENTOR(S) | : Gerald P. Michalak | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1603 days.

Signed and Sealed this

Fourteenth Day of December, 2010

David J. Kappos
*Director of the United States Patent and Trademark Office*